United States Patent
Tong

(10) Patent No.: US 11,959,626 B2
(45) Date of Patent: Apr. 16, 2024

(54) SHELF LIGHT FOR PLANT GROWTH

(71) Applicant: Ganlian Tong, Jiangxi (CN)

(72) Inventor: Ganlian Tong, Jiangxi (CN)

( * ) Notice: Subject to any disclaimer, the term of this patent is extended or adjusted under 35 U.S.C. 154(b) by 0 days.

(21) Appl. No.: 17/400,148

(22) Filed: Aug. 12, 2021

(65) Prior Publication Data

US 2023/0052875 A1 Feb. 16, 2023

(51) Int. Cl.
| | |
|---|---|
| *F21V 29/83* | (2015.01) |
| *F21S 6/00* | (2006.01) |
| *F21V 23/02* | (2006.01) |
| *G06F 1/16* | (2006.01) |
| *H02J 50/00* | (2016.01) |

(52) U.S. Cl.
CPC ............. *F21V 29/83* (2015.01); *F21S 6/005* (2013.01); *F21V 23/023* (2013.01); *G06F 1/1632* (2013.01); *H02J 50/005* (2020.01)

(58) Field of Classification Search
CPC ........ F21S 6/005; F21V 29/83; F21V 23/003; F21V 33/0012; F21V 23/023; A01G 7/045; A01G 7/041; A01G 9/249; G06F 1/1632; H02J 7/0042; H02J 50/005; Y02P 60/21
See application file for complete search history.

(56) References Cited

U.S. PATENT DOCUMENTS

| | | | | |
|---|---|---|---|---|
| 2016/0360712 | A1* | 12/2016 | Yorio | A01G 31/06 |
| 2017/0038527 | A1* | 2/2017 | Sherman | F21V 31/00 |
| 2017/0055538 | A1* | 3/2017 | Ohta | H05B 45/20 |
| 2017/0122549 | A1* | 5/2017 | Klase | A01G 7/045 |
| 2017/0354099 | A1* | 12/2017 | Haughton | A01G 9/249 |
| 2021/0050732 | A1* | 2/2021 | Caldarella | G02F 1/133 |
| 2022/0225579 | A1* | 7/2022 | Robell | A01G 9/249 |

FOREIGN PATENT DOCUMENTS

| | | | | | |
|---|---|---|---|---|---|
| CN | 208832187 | * | 11/2018 | | F21S 6/00 |
| KR | 1020100032974 | * | 3/2010 | | A01G 27/00 |
| KR | 10-1224217 | * | 1/2013 | | A01G 27/04 |
| KR | 1020140034020 | * | 3/2014 | | A47L 19/00 |

OTHER PUBLICATIONS

English Machine Translation of CN 208832187 provided by Espacenet (Year: 2018).*

* cited by examiner

*Primary Examiner* — Zheng Song

(57) ABSTRACT

Disclosed is a shelf light for plant growth having vertical stand with a plurality of wooden partitions vertically arranged in parallel at intervals and wooden vertical rod connected between adjacent wooden partitions, and lighting unit on top of vertical stand. Wooden partition on topmost end vertically is constructed as light holder for arranging lighting unit; power box powering lighting unit is mounted on another wooden partition below light holder; power box is provided with plug connecting wire accessing to electricity, with side wall configured with USB-A, USB-B and USB-C interfaces and top surface configured with wireless charging pad. The utility model, a framework entirely formed by connecting all-wooden materials, has firm structure, with functions of plant growth light, USB power docking station and wireless charging pad, so as to provide green decoration for home environment while compounding use of charging base stations, resulting in strong functionality and high space utilization.

5 Claims, 5 Drawing Sheets

US 11,959,626 B2

SHELF LIGHT FOR PLANT GROWTH

BACKGROUND OF THE INVENTION

The utility model relates to the technical field of the plant growth light, in particular, to a shelf light for plant growth.

The plant growth light is an artificial light source designed to stimulate plant growth by emitting electromagnetic spectral spectrum suitable for photosynthesis, and is widely used in indoor gardening, plant reproduction and food production, including indoor water-planted plants and aquatic plants. Although most of the plant lights are used in industrialization, it has also gradually become popular in the home as a plant floor light in recent years, in order to display green plant decoration.

At present, the plant floor lights in the market are either made from plastics or from plastics plus woods, resulting in unstable structural strength. And, the plant floor light is unitary in functions, and only has the function of displaying green plants, which leads to only occupation in the home environment space without strong functionality.

BRIEF SUMMARY OF THE INVENTION

In view of many drawbacks in the prior art, the utility model provides a shelf light for plant growth, which has the following technical solutions.

The shelf light for plant growth has a vertical stand and a lighting unit arranged on a top portion of the vertical stand, wherein:

the vertical stand has a plurality of wooden partitions arranged in parallel at intervals in a vertical direction, and a wooden vertical rod connected between the adjacent wooden partitions;

the wooden partition located at a topmost end in the vertical direction is constructed as a light holder for arranging the lighting unit;

a power box that powers the lighting unit is mounted on another wooden partition located below the light holder, and the power box is provided with a plug connecting wire for accessing to city electricity; a side wall of the power box is configured with a USB-A interface, a USB-B interface and a USB-C interface, and a top surface of the power box is configured with a wireless charging pad.

In the above technical solution, the wooden partition below the light holder is used to place green plants, the power box powers the lighting unit after being access to the city electricity, the lighting unit provides supplementary lighting for the green plants, and the power box further provides a USB charging port and the wireless charging pad.

Compared with the prior arts, the beneficial effects of the present utility model are:

(1) the overall framework is formed by connecting all-wood materials, with a firm structure;

(2) the utility model has functions of a plant growth light, a USB power docking station and a wireless charging pad, so that only green decoration can be provided for the home environment space, but also the use of charging base stations is compounded, thereby having a strong functionality and a high space utilization.

The utility model are further described below with reference to the accompanying drawings and specific embodiments of the specification.

DETAILED DESCRIPTION OF THE INVENTION

Figure 1:
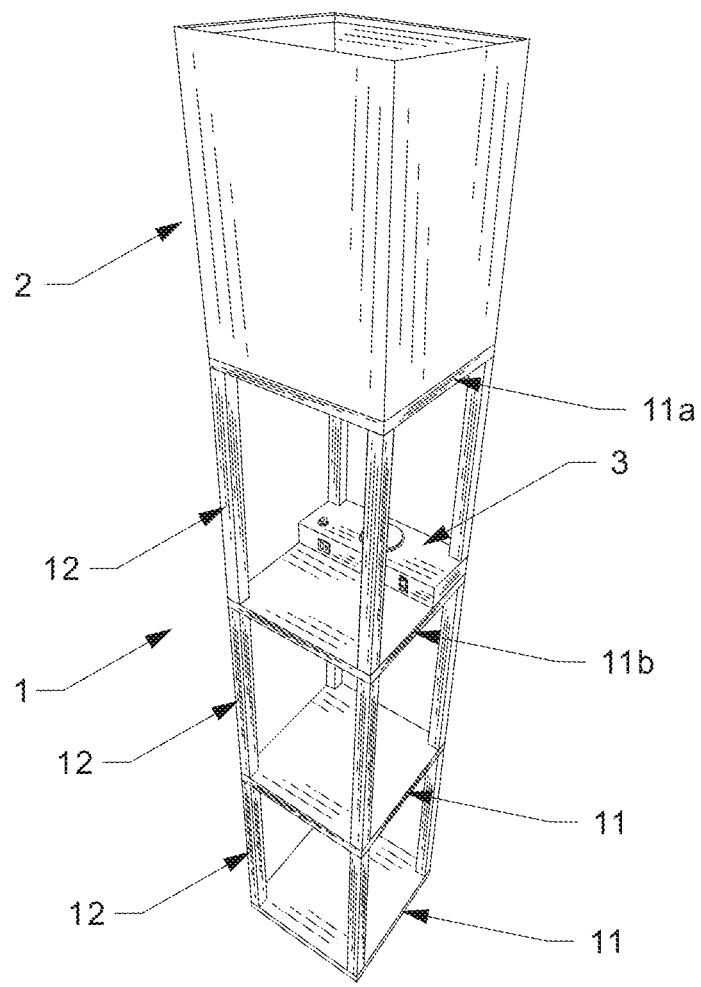
FIG. 1 is a structure diagram one of the utility model.
Figure 2:
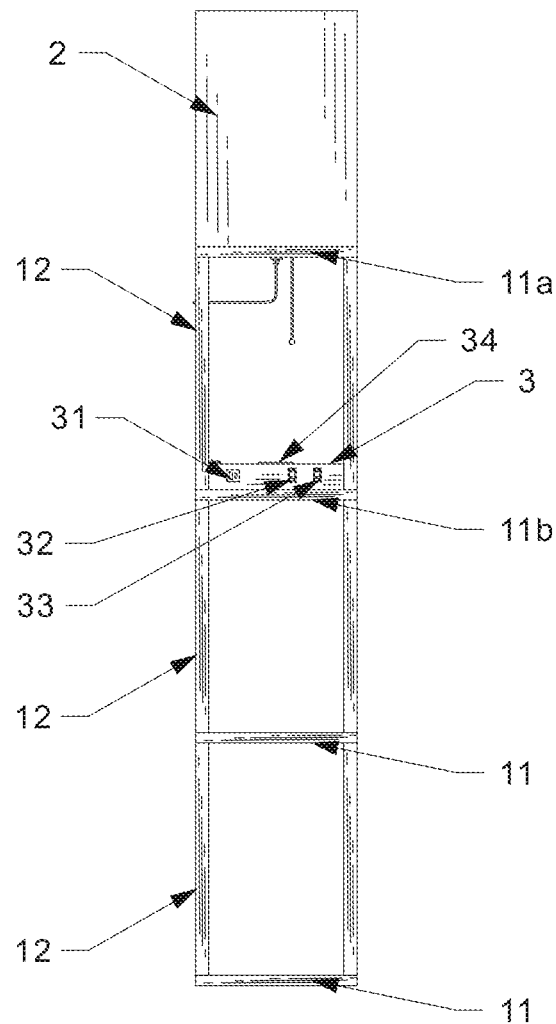
FIG. 2 is a structure diagram two of the utility model.
Figure 3:
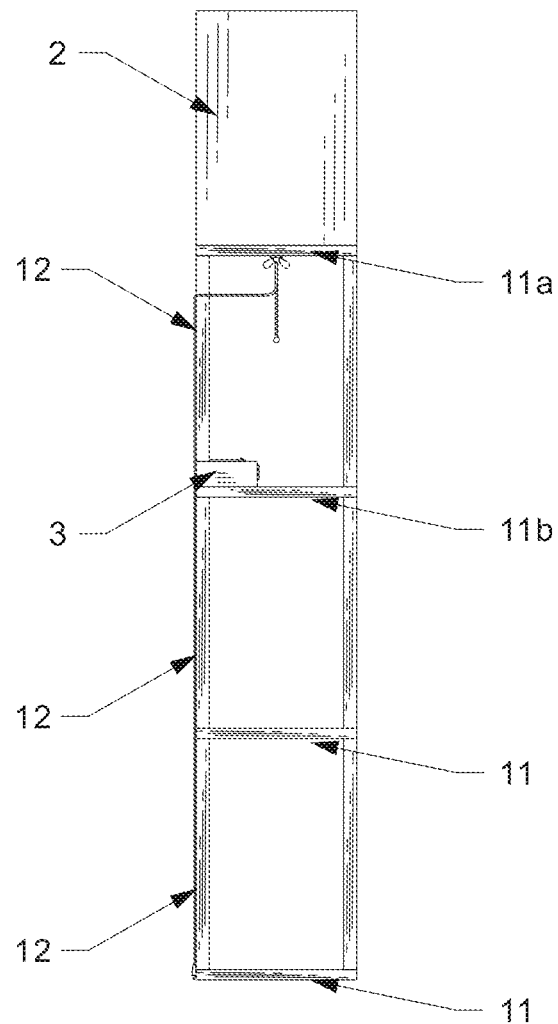
FIG. 3 is a structure diagram three of the utility model.
Figure 4:
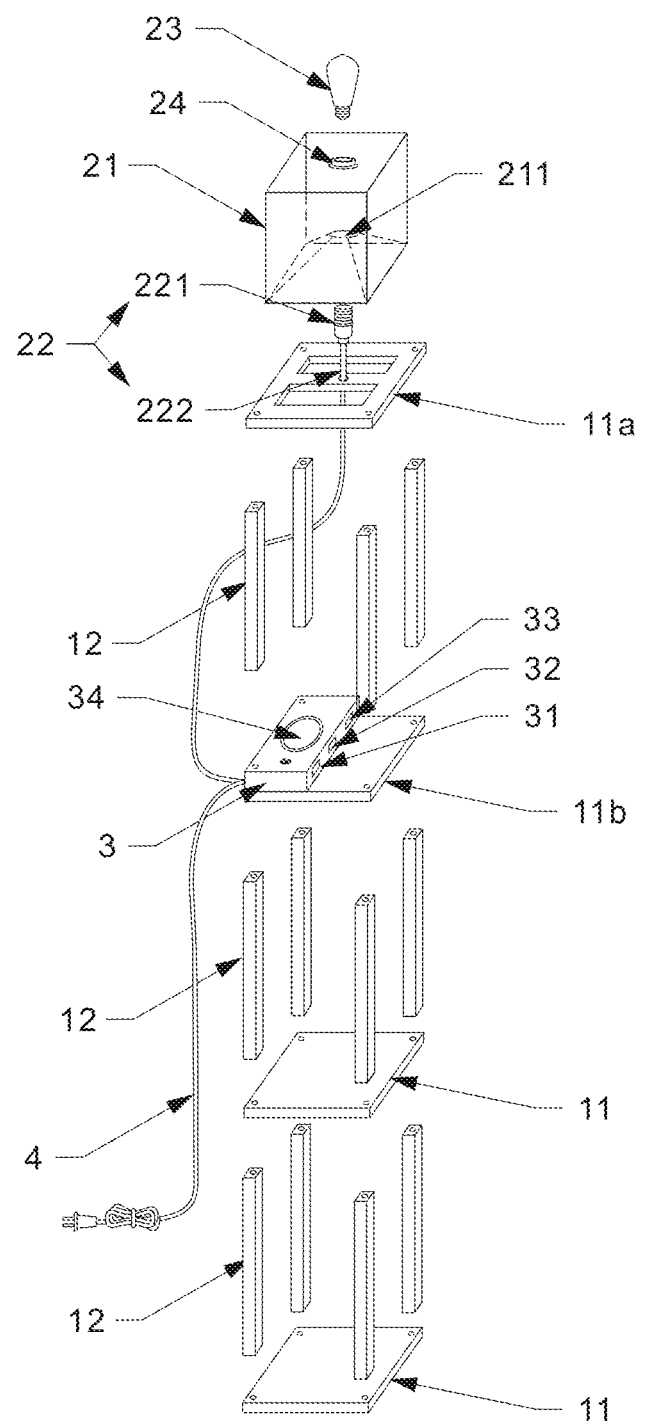
FIG. 4 is an exploded structure diagram of the utility model.
Figure 5:
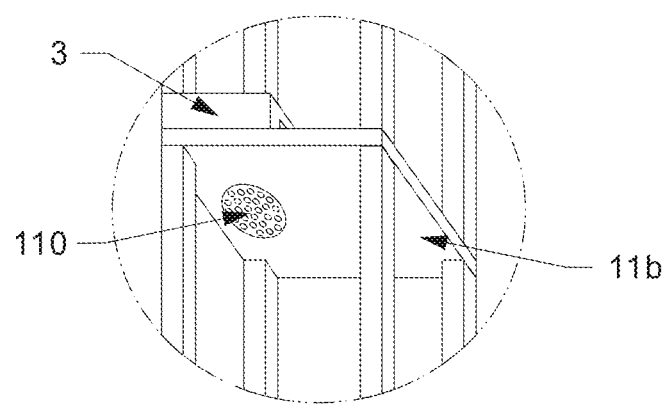
FIG. 5 is a structure diagram of a heat dissipation hole of the utility model.

As shown in FIGS. 1 to 5, a shelf light for plant growth has a vertical stand 1 and a lighting unit 2 arranged on a top portion of the vertical stand 1, wherein:

the vertical stand 1 has a plurality of wooden partitions 11 arranged in parallel at intervals in a vertical direction, and a wooden vertical rod 12 connected between the adjacent wooden partitions 11;

the wooden partition 11a located at a topmost end in the vertical direction is constructed as a light holder for arranging the lighting unit 2;

a power box 3 that powers the lighting unit 2 is mounted on another wooden partition 11b located below the light holder, and the power box 3 is provided with a plug connecting wire 4 for accessing to city electricity; a side wall of the power box 3 is configured with a USB-A interface 31, a USB-B interface 32 and a USB-C interface 33, and a top surface of the power box 3 is configured with a wireless charging pad 34.

In the above technical solution, in the shelf light for plant growth, the wooden partition 11 below the light holder is used to place green plants, the power box 3 powers the lighting unit 2 after being access to the city electricity, the lighting unit 2 provides supplementary lighting for the green plants, and the power box 3 further provides the USB charging function and the wireless charging function.

In the above technical solution, in the shelf light for plant growth, the overall framework is formed by connecting all-wood materials, with a firm structure;

In the above technical solution, the shelf light for plant growth has functions of a plant growth light, a USB power docking station and a wireless charging pad, so that only green decoration can be provided for the home environment space, but also the use of charging base stations is compounded, thereby having a strong functionality and a high space utilization.

Preferably, two ends of the wooden vertical rod 12 are removably connected to the wooden partitions 11 by screws respectively; therefore, the shelf light for plant growth in the utility model adopts the bulk assembly form designed by KD structure, which is convenient for storage and transportation, as well as for disassembly Preferably, the lighting unit 2 includes a light cover 21, a light base 22 arranged in the light cover 21 and a light bulb 23 arranged on the light base 22, the light base 22 having a head portion 221 arranged axially and vertically and a connecting portion 222 arranged at a lower end of the head portion 221, the light bulb 23 being removably mounted on the head portion 221 of the light base 22, the connecting portion 222 of the light base 22 passing through the wooden partition 11a that acts as the light holder by way of threaded cooperation, wherein the head portion 221 of the light holder 22 has an outer thread, and a bottom portion of the light cover 21 has a support 211 sleeved with the head portion 221 of the light base 22; a fixing ring 24 in threaded cooperation with the head portion 221 of the light base 22 is further configured, and the support 211 of the light cover 21 is fastened to the head portion 221 of the light base 22 by the fixing ring 24.

Preferably, the wooden partition 11 is in a square shape, and the wooden vertical rods 12 are arranged at four corners of the wooden partition 11.

Preferably, the power box 3 is biased at a side of the wooden partition 11b, and the remaining parts of the wooden partition 11b may be used as a storage space.

Preferably, the wooden partition 11b where the power box 3 is located is provided with a heat dissipation hole 110 corresponding to a bottom surface of the power box 3, so as to facilitate the heat dissipation of the power box 3.

For those skilled in the art, the scope of protection of the utility model is not limited to the details of the above-mentioned exemplary embodiments. Without departing from the spirit or basic characteristics of the utility model, all changes in the equivalent meaning and protection made by those skilled in the art based on the elements of the utility model shall be included in the utility model.

What is claimed is:

1. A shelf light for plant growth, having a vertical stand and a lighting unit arranged on a top portion of the vertical stand, wherein
   the vertical stand has a plurality of wooden partitions arranged in parallel at intervals in a vertical direction, and a wooden vertical rod connected between the adjacent wooden partitions;
   the wooden partition located at a topmost end in the vertical direction is constructed as a light holder for arranging the lighting unit;
   a power box that powers the lighting unit is mounted on another wooden partition located below the light holder, and the power box is provided with a plug connecting wire for accessing to city electricity; a side wall of the power box is configured with a USB-A interface, a USB-B interface and a USB-C interface, and a top surface of the power box is configured with a wireless charging pad;
   the lighting unit comprises a light cover, a light base arranged in the light over and a light bulb arranged on the light base, the light base having a head portion arranged axially and vertically and a connecting portion arranged at a lower end of the head portion, the light bulb being removably mounted on the head portion of the light base, the connecting portion of the light base passing through the wooden partition that acts as the light holder by way of threaded cooperation, wherein the head portion of the light holder has an outer thread, and a bottom portion of the light cover has a support sleeved with the head portion of the light base; a fixing ring in threaded cooperation with the head portion of the light base is further configured, and the support of the light cover is fastened to the head portion of the light base by the fixing ring.

2. The shelf light for plant growth according to claim 1, wherein two ends of the wooden vertical rod are removably connected to the wooden partition by screws respectively.

3. The shelf light for plant growth according to claim 1, wherein the wooden partition is in a square shape, and the wooden vertical rods are arranged at four corners of the wooden partition.

4. The shelf light for plant growth according to claim 1, wherein the power box is biased on a side of the wooden partition.

5. The shelf light for plant growth according to claim 1, wherein the wooden partition where the power box is located is provided with a heat dissipation hole corresponding to a bottom surface of the power box.

* * * * *